(12) United States Patent
Kang

(10) Patent No.: US 7,534,305 B2
(45) Date of Patent: May 19, 2009

(54) METHOD FOR CONTROLLING RESIN REGENERATION OF DISHWASHER

(75) Inventor: Myung Ho Kang, Busan (KR)

(73) Assignee: LG Electronics Inc., Seoul (KR)

( * ) Notice: Subject to any disclaimer, the term of this patent is extended or adjusted under 35 U.S.C. 154(b) by 531 days.

(21) Appl. No.: 10/917,490

(22) Filed: Aug. 13, 2004

(65) Prior Publication Data

US 2005/0178406 A1 Aug. 18, 2005

(30) Foreign Application Priority Data

Feb. 13, 2004 (KR) .................. 10-2004-0009393

(51) Int. Cl.
*B08B 7/00* (2006.01)

(52) U.S. Cl. .................. 134/18; 134/25.2; 134/56 D; 134/57 D; 134/58 D; 134/95.2; 134/200

(58) Field of Classification Search ............ 134/18, 134/25.2, 25.3, 95.2, 200, 56 D, 57 D, 58 D
See application file for complete search history.

(56) References Cited

U.S. PATENT DOCUMENTS

| 4,732,171 | A  | * | 3/1988 | Milocco ............... 134/57 D |
| 6,598,611 | B1 | * | 7/2003 | Durazzani ............ 134/95.2 |
| 6,766,812 | B1 | * | 7/2004 | Gadini ............... 134/56 D |

* cited by examiner

*Primary Examiner*—Michael Barr
*Assistant Examiner*—Saeed T Chaudhry
(74) *Attorney, Agent, or Firm*—Ked & Associates, LLP

(57) ABSTRACT

A method of controlling a dishwasher having a water softening function performed by a water softener is disclosed. The method includes the steps of loading in the dishwasher an item to be washed, supplying washing water through the water softener, washing the loaded item using the supplied washing water, drying the washed item, and regenerating, during said drying step, the water softening function.

19 Claims, 6 Drawing Sheets

METHOD FOR CONTROLLING RESIN REGENERATION OF DISHWASHER

This application claims the benefit of Korean Application No. P2004-009693, filed on Feb. 13, 2004, which is hereby incorporated by reference.

BACKGROUND OF THE INVENTION

1. Field of the Invention

The present invention relates to a dishwasher, and more particularly, to a method for controlling a dishwasher having a water softener for changing a supplied washing water into a soft water.

2. Discussion of the Related Art

FIG. 1 is a view of a general dishwasher. Referring to FIG. 1, the dishwasher includes: a main body 2 having an opening at a front side; a door 4 openably installed on the front side of the main body 2; a washing tub 6 installed inside the main body 2, for washing dishes; a shelf 8 movably installed inside the washing tub 6, for receiving the dishes; a nozzle 10 rotatably installed in a lower side of the shelf 8, for spraying washing water through a spraying hole 10a; a sump 12 formed on a lower side of the washing tub 6, for collecting washing water; a washing pump (not shown) installed on one side of the sump 12, for pumping washing water through the nozzle 10; and a controller (not shown) installed inside the main body 2, for controlling an operation of the dishwasher.

At a lower side of the washing tub 6, the dishwasher further includes: a heater (not shown) for heating washing water supplied to the inside of the sump 12; a water supply device having a wafer supply passage 20 through which a supplied washing water flows and a water supply valve 22 for opening and closing the water supply passage 20; a drain device having a drain passage 30 through which a drained washing water flows and a drain pump 32 for draining washing water through the drain passage 30; and a water softener 40 for communicating with the water supply passage 20 and changing a supplied washing water into a soft water.

Also, the door 4 includes: a steam inlet port 4a for inhaling steam in the inside of the washing tub 6; a steam outlet port 4b for discharging the inhaled steam out of the door; and a ventilator 16 formed between the steam inlet port 4a and the steam outlet port 4b.

Referring to in FIG. 2, a guide tub 50 is installed between the main body 2 and the washing tub 6. In the guide tub 50, the water supply passage 20, the drain passage 30 and an air inlet passage 18 for inhaling air from the outside are separated from one another.

An entrance of the water softener 40 is connected with the water supply passage 20 and the exit of the water softener 40 is connected with the sump 12.

An ion-exchange-resin reservoir 42 with a built-in ion-exchange resin 42a, a salt reservoir 44, a regeneration valve 46 are provided in the inside of the water softener 40. The regenerator valve 46 is formed between the salt reservoir 44 and the ion-exchange-resin reservoir 42 and prevents a regenerative water 44a from flowing into the ion-exchange-resin reservoir 42 from the salt reservoir 44.

Here, the ion-exchange-resin tank 42 is filled with the ion-exchange resin 42a for adsorbing/removing hard water component, such as heavy metal and metallic ion, thereby changing a washing water supplied from the sump 12 into a soft water having a good washability.

Also, the salt reservoir 44 is filled with salt. Therefore, if a predetermined amount of washing water is supplied to the salt reservoir 44 through the water supply passage 20, a salt water to be used as the regenerative water 44a is formed in the salt reservoir 44 and the regenerative water 44a is supplied to the ion-exchange-resin reservoir 42 through the regeneration valve 46, such that the ion-exchange resin 42a is regenerated. The controller controls the flowing of the regenerative water 44a and the regeneration of the ion-exchange-resin 42a by opening/closing the regeneration valve 46.

An operation of the dishwasher constructed as above will now be described. Referring to FIG. 3, the controller of the dishwasher opens the water supply valve 22 so as to supply a washing water along the water supply passage 20 to the sump 12 (ST1). Then, a washing water pumped by the washing pump 14 is sprayed through the spraying hole 10a of the nozzle 10, so that the dishes received in the shelf 8 are washed (ST2). A detergent is put into the washing tub 6 so that a dish washing operation is smoothly performed.

Also, a washing water flowing through the water supply passage 20 reacts with the ion-exchange resin 42a and a hard water component is removed, thereby increasing a detergent solubility of washing water. As a result, a washing performance of the dishwasher is improved. However, if the water softening reaction of washing water is performed continuously, the ion-exchange resin 42a is exhausted and the water softening performance of the water softener 40 is deteriorated. Therefore, if the washing step is completed, the controller regenerates the ion-exchange resin 42a by inputting regenerative water 44a into the ion-exchange resin 42a (ST3). In other words, the controller supplies a regenerative water 44a of the salt reservoir 44 to the ion-exchange-resin reservoir 42 by closing the water supply valve 22 and opening the regeneration valve 46.

Then, the ion-exchange resin 42a is regenerated by ion-exchange reaction of the ion-exchange resin 42a with the regenerative water 44a, recovering a water softening property of the washing water. Next, the controller supplies a washing water to the ion-exchange-resin reservoir 42 by closing the regeneration valve 46 and opening the water supply valve 22 and drains the hard water and regenerative water, which remain in the ion-exchange-resin reservoir 42 due to the supplied washing water, thereby washing the ion-exchange-resin reservoir 42 (ST3).

Also, the controller supplies a washing water from the water supply valve 22 to the sump 12. The washing water of the sump 12 is pumped by the washing pump and thus flows into the nozzle 10. Also, the washing water is sprayed through the spraying hole 10a of the nozzle 10, so that the washed dish is rinsed (ST4). In step ST4, the hard water component of the washing water supplied to the sump is removed by the water softener 40 and a detergent is not put into the washing tub 6. Then, the washing water in the inside of the washing tub 6 is completely drained to the outside by means of the drain device (ST5). The ventilator 16 installed in the door 4 operates to dry the inside of the washing tub 6 (ST6).

However, the dishwasher operating in this manner has a problem that deteriorates performance of the water softener. The reason is that the time required for regenerating the ion-exchange resin is not sufficient because the regeneration and washing steps (ST3) for regenerating and washing the ion-exchange resin at the water softener is performed between the washing step and the rising step. In other words, since the washing water for washing the ion-exchange resin is introduced at the time point when the introduction of the regenerative water for regenerating the ion-exchange resin is completed, reaction time for the ion-exchange resin and the regenerative water is not sufficient. Therefore, regeneration of the ion-exchange resin is not performed completely, thus degrading the water softening performance of the ion-exchange resin.

Also, the step of regenerating and washing the ion-exchange resin is performed according to a predetermined time regardless of a hardness value of washing water for washing the dishes. Therefore, in case the washing water has a high hardness, the hard water component still remains in the ion-exchange resin even after the step of regenerating and washing the ion-exchange resin, resulting in the degradation of the water softening performance of the ion-exchange resin: Particularly, since the hard water component remaining in the ion-exchange-resin reservoir 42 flows into the inside of the washing tank together with supplied washing water, the washed dishes is re-contaminated in the washing step or the washing performance of the dishwasher is deteriorated.

SUMMARY OF THE INVENTION

Accordingly, the present invention is directed to a method for controlling a dishwasher that substantially obviates one or more problems due to limitations and disadvantages of the related art.

An object of the present invention is to provide a method for controlling a dishwasher, capable of sufficiently securing regeneration time of the ion-exchange resin by performing regeneration of the ion-exchange resin during a drying of the dishes.

Another object of the present invention is to provide a method for controlling a dishwasher, capable of preventing recontamination of the washed dishes by performing regeneration of the ion-exchange resin after a dish washing is performed.

A further object of the present invention is to provide a method for controlling a dishwasher, capable of efficiently regenerating the ion-exchange resin by setting the regeneration time of the ion-exchange resin depending on hardness of washing water.

To achieve these objects and other advantages and in accordance with the purpose of the invention, as embodied and broadly described herein, a method of controlling a dishwasher having a water softening function performed by a water softener, includes the steps of loading in the dishwasher an item to be washed, supplying washing water through the water softener, washing the loaded item using the supplied washing water, drying the washed item, and regenerating, during said drying step, the water softening function.

The washing step may include the steps of mixing a detergent into the supplied washing water to produce a washing water solution for washing the loaded item, rinsing the washed item using the supplied washing water, and draining the washing water from the dishwasher. The drying and regenerating steps may begin and end simultaneously. The water softening function of the water softener may be achieved using an ion-exchange resin.

The regenerating step may include the steps of regenerating the ion-exchange resin by supplying regenerative water to the water softener, and washing the ion-exchange resin by supplying washing water to the regenerated ion-exchange resin. The regenerating step may also include the steps of setting a regeneration time based on a predetermined hardness of the washing water, and comparing the set regeneration time with a duration of the supply of regenerative water to the water softener, wherein the regenerative water is supplied to the water softener based on the set regeneration time.

The method of controlling the dishwasher may include the steps of measuring a duration of the supply of regenerative water to the water softener, and discontinuing the supply of regenerative water to the water softener if the set regeneration time is exceeded. The predetermined hardness of the washing water is a value detected by a water hardness sensor. And, the predetermined hardness of the washing water is a value selected by a user. Herein, the regenerating step may include the steps of setting a number of washings of the ion-exchange resin based on a predetermined hardness of the washing water, and applying washing water to the ion-exchange resin for a predetermined washing time of the ion-exchange resin based on the set number of washings. The applying step is repeated for a number times equal to the set number of washings.

The method of controlling the dishwasher may include a step of draining the washing water supplied by each repetition of said applying step, counting the repetitions of said applying step, and discontinuing the repetition of said applying step if the set number of washings is exceeded.

In another aspect of the present invention, a method for controlling a dishwasher having a water softener, includes the steps of supplying the washing water for washing a dish through the water softener, mixing a detergent with the washing water, washing the dish using the washing water where a detergent is mixed, rinsing the washed dish using the washing water, draining the washing water, supplying a regenerative water to the ion-exchange resin of the water softener to regenerate the ion-exchange resin simultaneously with drying the washed dish, supplying a washing water to the regenerated ion-exchange resin to wash the ion-exchange resin, and ending the washing of the ion-exchange resin simultaneously with ending the drying of the dish.

The step of regenerating the ion-exchange resin may include the steps of checking a predetermined hardness of the washing water, setting a regeneration time depending on the checked hardness of the washing water, supplying a regenerative water to the ion-exchange resin depending on the set regeneration time, judging whether a regenerative-water-supplying time exceeds the regeneration time, and if the regenerative-water-supplying time is judged to exceed the regeneration time, stopping the supplying of regenerative water.

The predetermined hardness of the washing water may be inputted by a user, or detected and set by a hardness sensor. If the regenerative-water-supplying time is judged not to exceed the regeneration time, the step of supplying a regenerative water to the ion-exchange resin may be repeatedly performed. The step of washing the ion-exchange resin may include the steps of checking a predetermined hardness of the washing water and a washing time of the ion-exchange resin, setting the number of times of the washing for the ion-exchange resin depending on the checked hardness of the washing water, judging whether the set number of times of the washing is zero, if the set number of times of the washing is judged not to be zero, supplying the washing water to the ion-exchange resin, judging whether a supplying time of the washing water exceeds a washing time of the ion-exchange resin, if the supplying time of washing water is judged to exceed washing time of the ion-exchange resin, stopping the supplying of washing water, draining the supplied washing water, judging whether the number of times of supplying the washing water exceeds the set number of times of the washing, if the number of times of supplying the washing water is judged to exceed the set number of times of the washing, ending the washing of the ion-exchange resin.

If the set number of times of the washing is judged to be zero, the step of washing the ion-exchange resin may be ended. If the supplying time of washing water is judged not to exceed the washing time of the ion-exchange resin, the step of supplying the washing water to the ion-exchange resin may be repeatedly performed. Furthermore, if the number of times of supplying the washing water is judged not to exceed the set number of times of the washing, the step of supplying the washing water to the ion-exchange resin may be repeatedly performed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
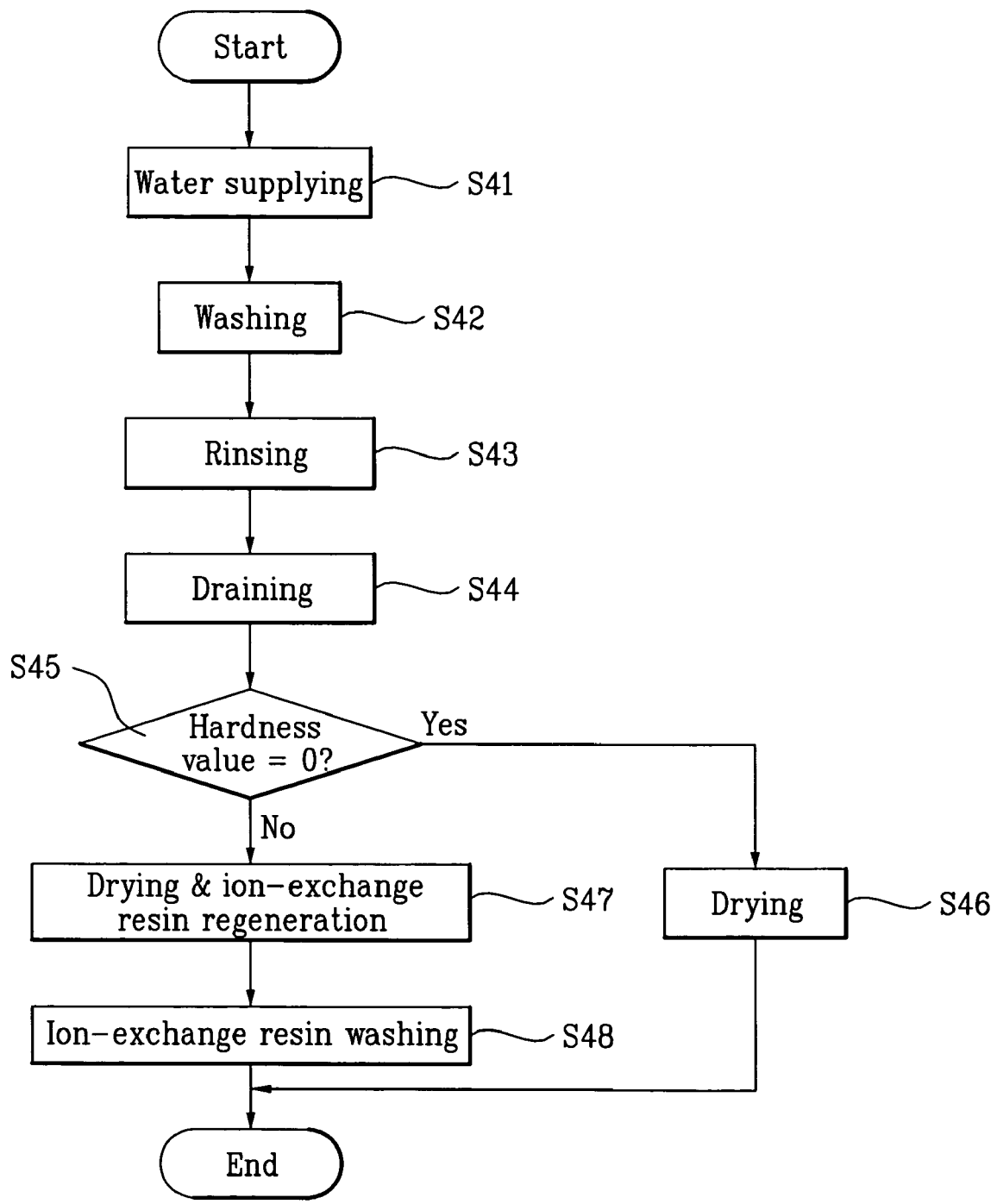
FIG. 4 is a flowchart of a method for controlling a dishwasher according to the present invention.

FIG. 4 is a flowchart showing a method for controlling a dishwasher according to the present invention.

Figure 1:
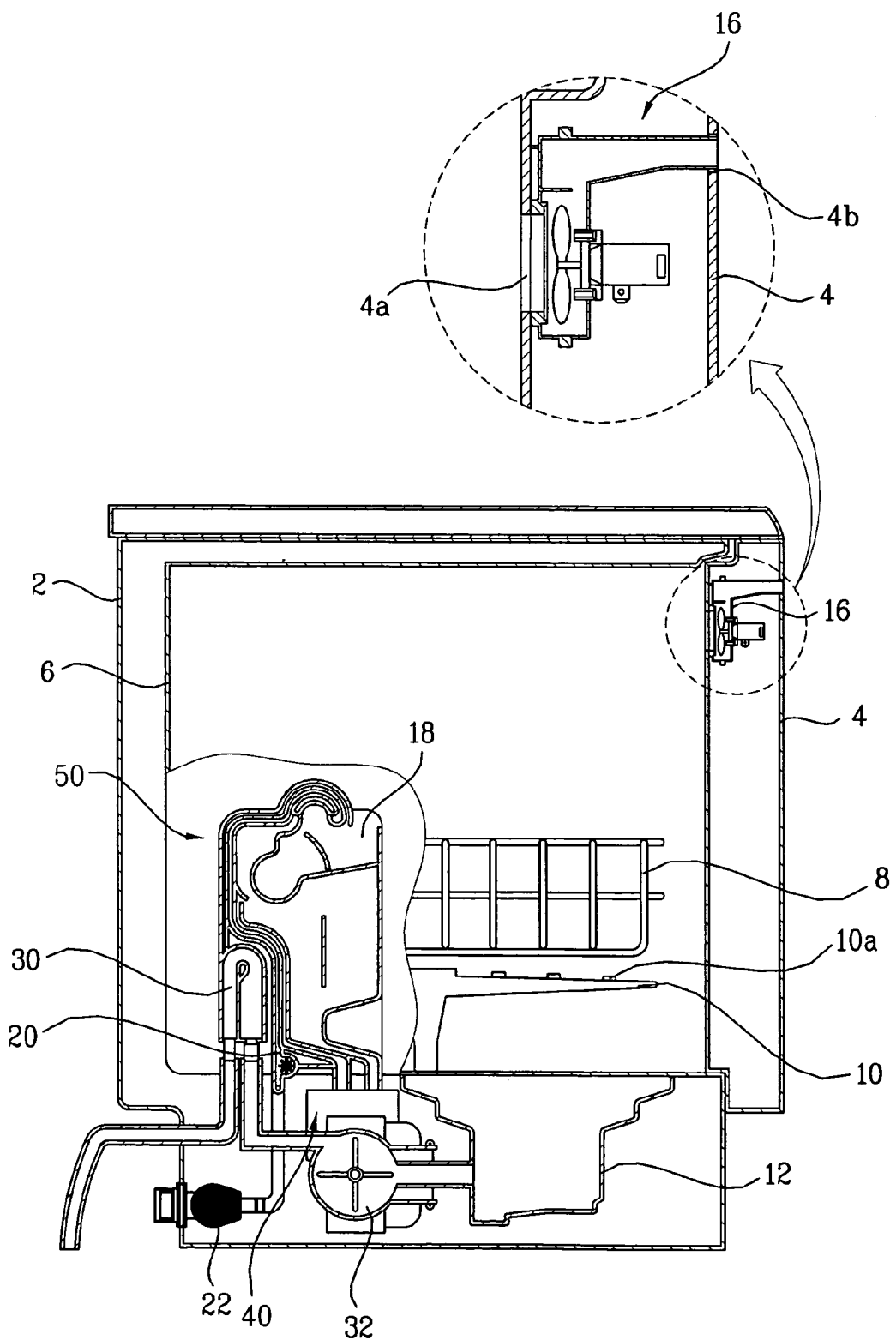
FIG. 1 is a view of a construction of a general dishwasher.
Figure 2:
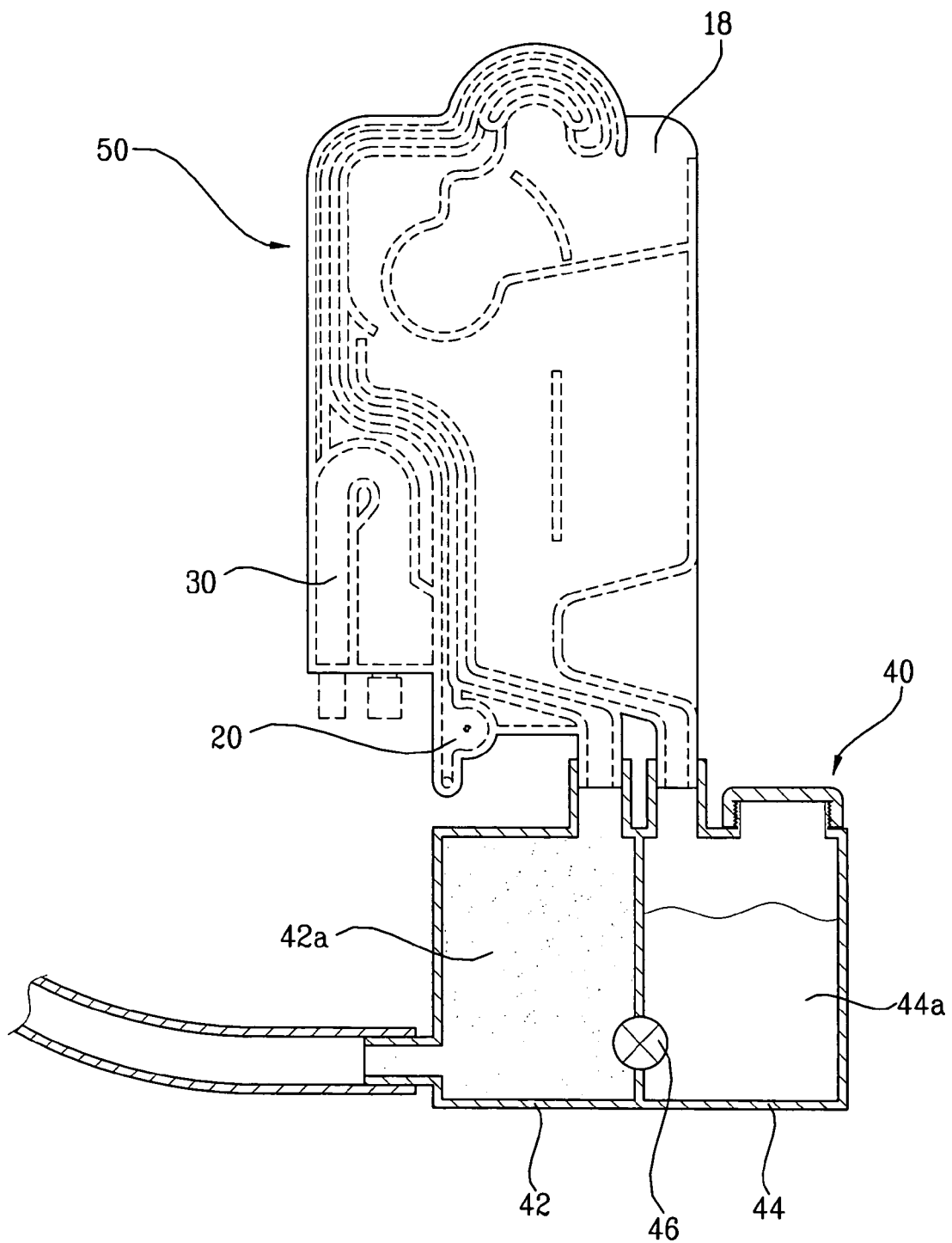
FIG. 2 is a view of a guide tub and a water softener of FIG. 1.
Figure 3:
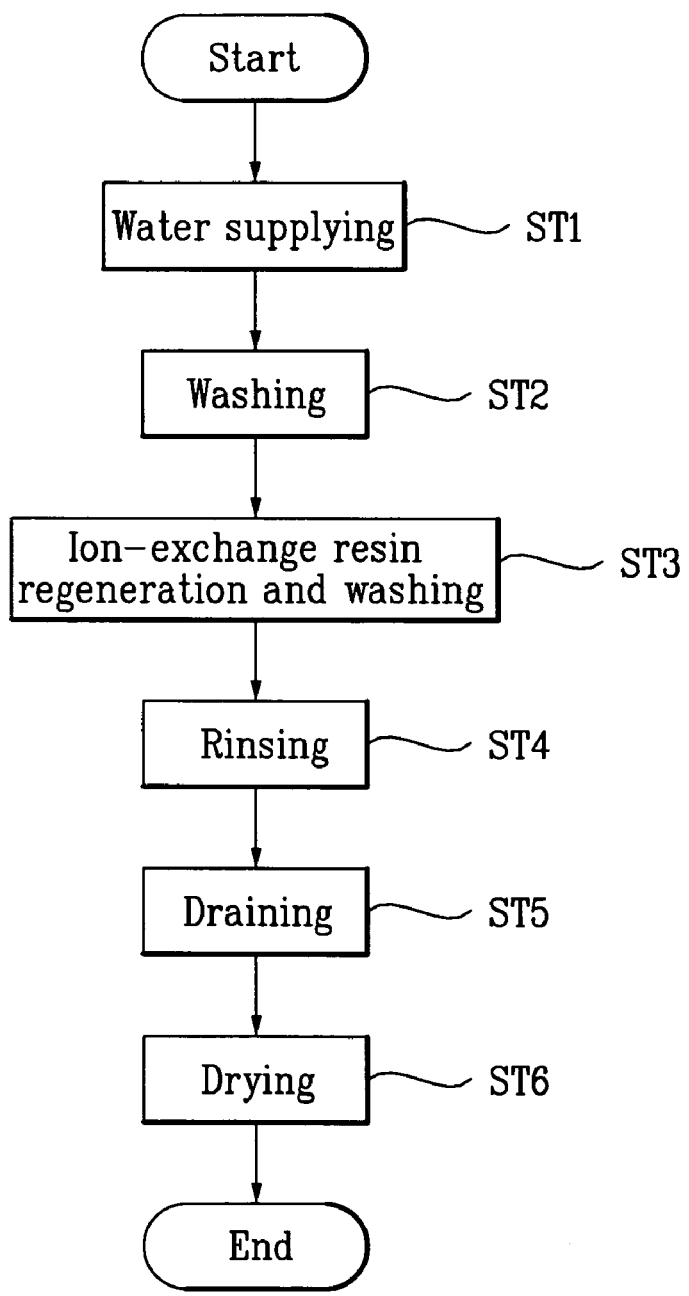
FIG. 3 is a flowchart of a method for controlling a general dishwasher.

Referring to FIGS. 1, 2 and 4, a washing water is supplied to an inside of a washing tub 6 of the dishwasher through a water supply device (S41).

In other words, if the water supply valve 22 is opened, a washing water is supplied along a water supply passage 20 to a sump 12 from an outside, and the washing water flowing in the water supply passage 20 is changed into a soft water while passing through the water softener 40.

Here, the washing water provided to the water softener 40 reacts with the ion-exchange resin 42a and changes into a soft water, so that a hard water component of the washing water is removed and a detergent solubility of washing water is increased, which improves washing performance of the dishwasher. Then, the washing water supplied to the sump 12 is sprayed to the inside of the washing tub 6 together with a detergent and washes the received dish (S42).

Namely, the washing water supplied to the sump 12 is pumped by a washing pump 14 and sprayed through a spraying hole 10a of a nozzle 10 to the shelf 8 where the dish is received. At a specific time point when the dish is washed by a spraying force of the washing water, a predetermined amount of detergent is introduced to the washing tub 6, so that a dish washing may also be performed by washability of detergent.

As described above, since the washing water used in washing the dish is soft water, having its hard water component removed by the water softener 40, a detergent is well dissolved and thus a washability is good. The hard water component, such as magnesium and calcium ions, is removed so that the washing water becomes clearer.

Next, as a rinsing step, the washing pump 41 completely removes a remaining detergent and contaminant from the dishes by spraying a washing water only (S43). The washing water is supplied to the sump 12 by the water supply device and the supplied washing water is changed into the soft water by the water softener 40. The washing water pumped by the washing pump 14 is sprayed to the shelf 8 through the spraying hole 10a of the nozzle 10. However, at the rinsing step, a detergent is not used and the dish is rinsed only by the spraying force of washing water.

Generally, the rinsing step is repeatedly performed over several times. In a final rinsing step, the dish is rinsed with a washing water heated by a heater, so that rinsing performance is improved and sterilization of the dish is possibly made.

Next, as a drain step, the washing water used in the rinsing step is all drained to the outside (S44). The washing water used in the washing step has been already drained before the rinsing step. Therefore, at a current drain step, only the washing water supplied at the rinsing step is drained along the drain passage 30 to the outside by means of the drain pump 32. A plurality of drain processes may be performed during the dish washing and the dish rinsing.

Next, it is determined whether a predetermined hardness value of the washing water has been set and is stored in a memory (not shown) of the dishwasher, and specifically, it is determined whether the hardness value is greater than zero (S45). The hardness value may be input by a user or measured by a hardness sensor (not shown) of the dishwasher. If the hardness value stored in the memory is zero, the controller performs normal drying (S46). Here, drying is carried out using the ventilator 16 installed in the door 4, whereby external air is introduced to the washing tub 6 through the air inlet passage 18 of the water guide 50 and the humid air within the washing tub is expelled via the steam inlet and outlet ports 4a and 4b of the door.

Figure 5:
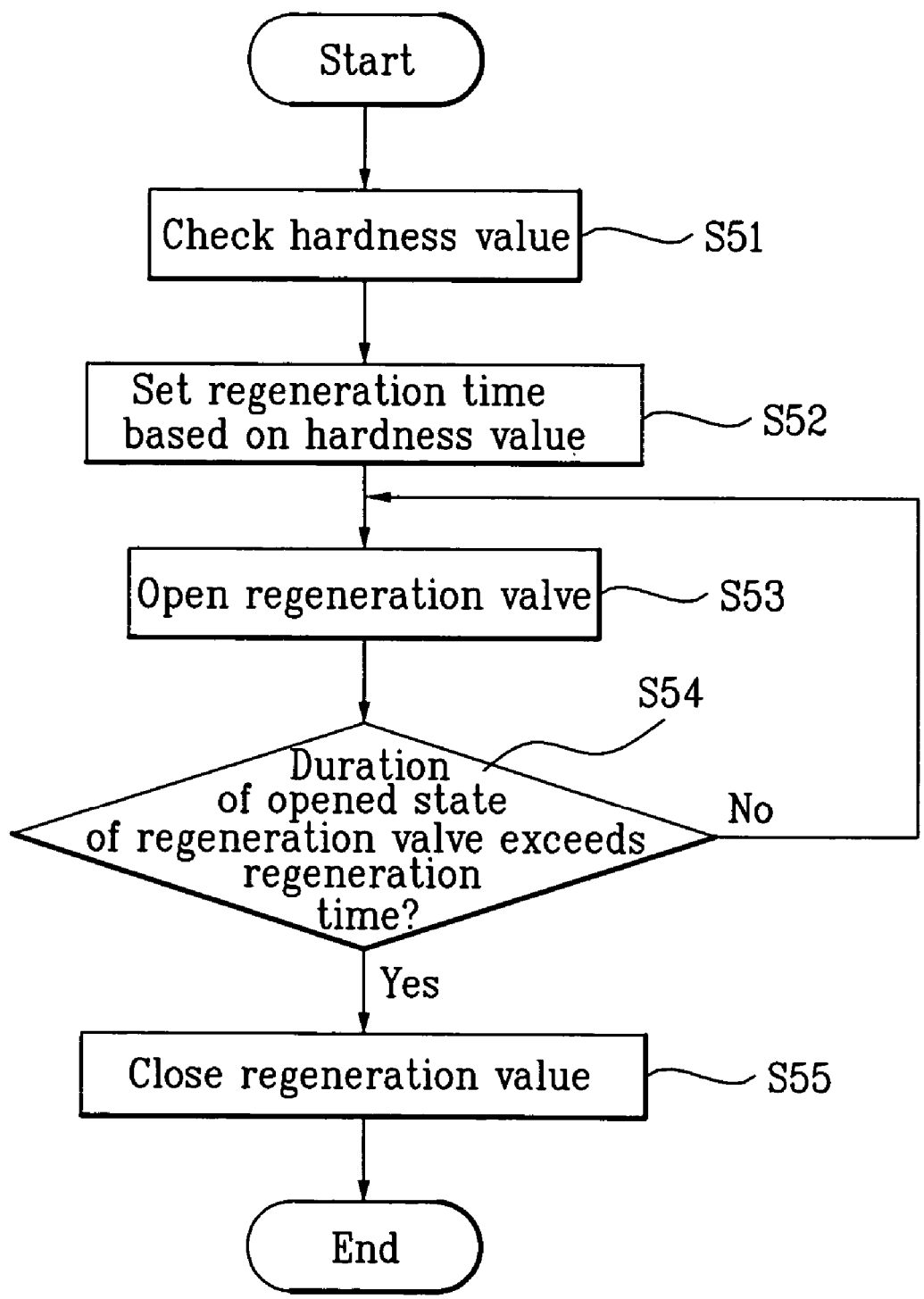
FIG. 5 is a flowchart of a process for regenerating ion-exchange resin.
Figure 6:
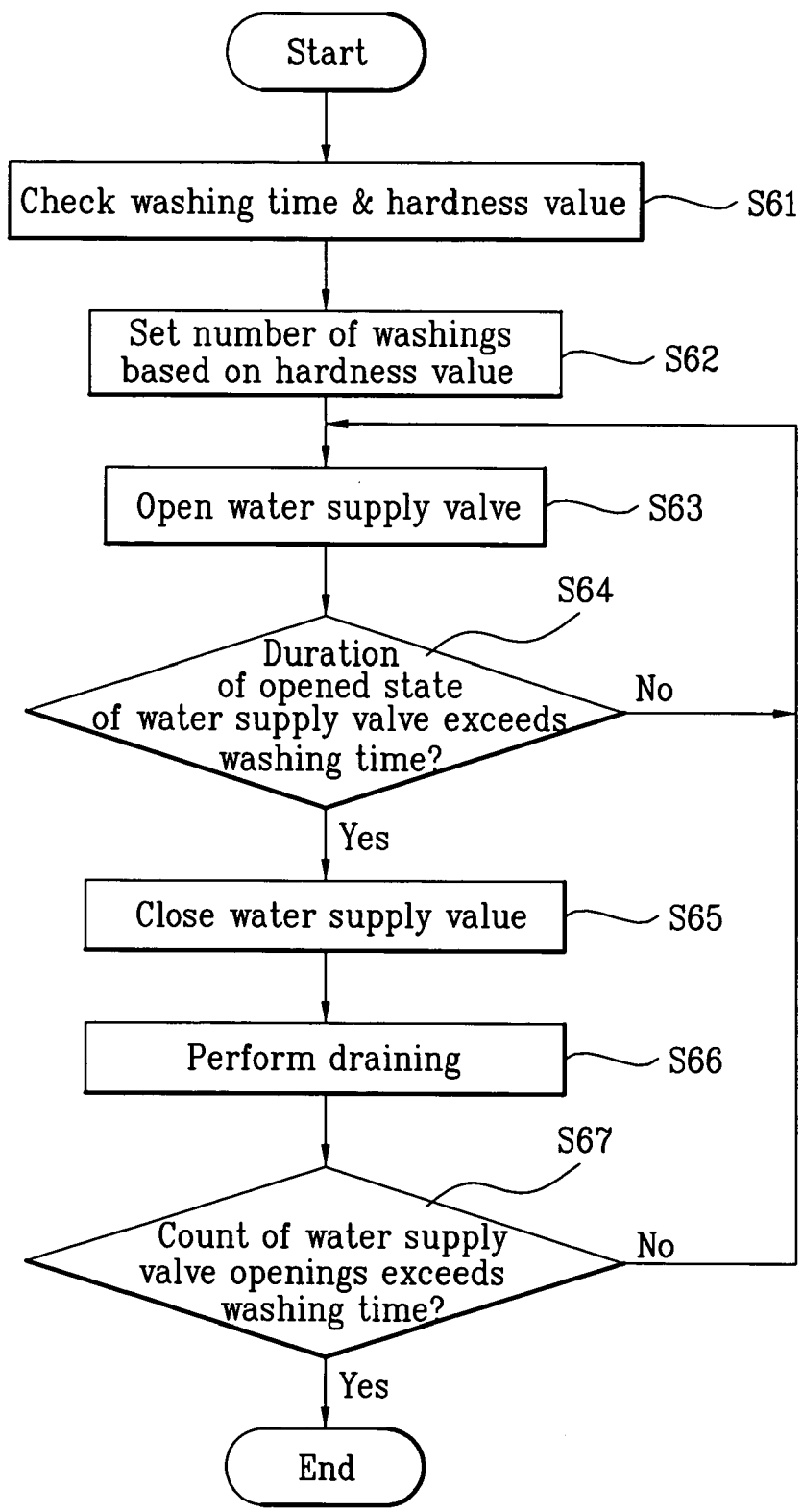
FIG. 6 is a flowchart of a process for washing ion-exchange resin.

In the event of a hardness value greater than zero, however, the controller performs the processes of FIGS. 5 and 6, corresponding to steps S47 and S48 of FIG. 4, respectively.

Ion-exchange-resin regeneration is performed simultaneously with the drying step. The ion-exchange-resin regenerating step regenerates the ion-exchange resin of the water softener 40 using a regenerative water 44a. When the drying step starts, the regenerative water 44a is introduced into the ion-exchange-resin reservoir 42 so as to regenerate the ion-exchange resin.

FIG. 5 illustrates a process for the regeneration of ion-exchange resin in the step S47 of FIG. 4. Referring to FIG. 5, the controller checks a preset hardness value of washing water stored in a memory (S51). The hardness value may be input by a user or measured by a hardness sensor. Then, the controller sets a regeneration time of the ion-exchange resin depending on the checked hardness value of the washing water (S52).

For example, hardness values of "1" through "7" may be assigned to set regeneration times of, for example, 7, 14, 21, 28, 35, 42, and 49 units, respectively. Thus, higher hardness values correspond to higher degrees of water hardness, which require longer regeneration times. A water hardness value of "0" indicates that no ion-exchange resin regeneration is necessary, that is, drying is performed without an ion-exchange resin regeneration step.

The regeneration time of the ion-exchange resin means a duration for which the regeneration valve 46 is opened. A longer regeneration time is set as the hardness value of washing water becomes larger, so that an amount of regenerative water 44a provided to the ion-exchange resin 42a is increased. On the contrary, a shorter regeneration time of the ion-exchange resin is set as the hardness value of washing water becomes smaller, so that an amount of regenerative water 44a is decreased.

The present invention categorizes the hardness values of the supplied washing water into zeroth ($0^{th}$) through seventh ($7^{th}$) levels, and previously stores a proper regeneration time in the memory depending on each hardness level. The exact manner in which the hardness values and regeneration times are set, however, such manner depends on the design conditions of the dishwasher.

Next, the controller supplies the regenerative water 44a from the salt reservoir to the ion-exchange-resin reservoir by opening the regeneration valve 46, depending on the set regeneration time.

Also, the controller compares the opening time of the regeneration valve 46 with the regeneration time of the ion-exchange resin. If the opening time of the regeneration valve 46 is judged to exceed the regeneration time of the ion-exchange resin, the controller closes the regeneration valve 46 (S53, S54, and S55). Therefore, a proper amount of regenerative water 44a is supplied to the ion-exchange-resin reservoir 42 depending on the hardness value of the washing water, so that the ion-exchange resin 42a is properly regenerated.

If the regeneration step of the ion-exchange resin is completed in this manner, the ion-exchange-resin rinsing step washes out a hard water component and regenerative water 44a remaining at the inside of the ion-exchange-resin reservoir 42. The washing step of the ion-exchange resin is set to be completed simultaneously with the ending of the drying step. In other words, the starting time of the dish drying step is the same as the starting time of the regeneration step of the ion-exchange resin, and the completion time of the dish drying step is the same as the completion time of the washing step of the ion-exchange resin.

According to the present invention, since the ion-exchange reaction between the regenerative water 44a and the ion-exchange resin 42a occurs during a time interval from the time point when the dish drying step starts to the time point when the washing step of the ion-exchange resin starts, sufficient time can be secured for regeneration of the ion-exchange resin.

FIG. 6 illustrates a process for the washing of ion-exchange resin in the step S48 of FIG. 4. Referring to FIG. 6, the controller checks the hardness value of the washing water and a washing time value of the ion-exchange resin, which are stored in the memory (S61). The washing time value of the ion-exchange resin determines the duration for which the water-supplying valve 22 is to be opened for executing one washing of the ion-exchange resin 42a. A predetermined washing time is stored in the memory of the dishwasher.

Then, the controller judges the number of times of washing of the ion-exchange resin with consideration of the checked hardness value of the washing water (S62). For example, the ion-exchange resin may be washed fewer times (e.g., once or one time) for lower hardness values, for example, for water hardnesses of "1", "2", "3", or "4", and may be washed more times (e.g., thrice or three times) for higher hardness values, for example, for water hardnesses of "5", "6", or "7", in which case the number of washings is set to one for a lower range of hardness values, i.e., 1 to 4, and is set to three for a higher range of hardness values, i.e., 5 to 7. A water hardness value of "0" would in effect result in setting the number of washings to "0", which means that the process of FIG. 6 is not performed.

The number of washings is a count of the occurrences of the water-supplying valve 22 being opened to perform a washing of the ion-exchange resin. The number of washings increases with the increase of the hardness value of the washing water and decreases with the decrease of the hardness value of the washing water.

According to the present invention, the number of washings and the hardness values of the ion-exchange resin are categorized into three levels. The exact manner in which the number of washings is set, however, such manner depends on the design conditions of the dishwasher. If the hardness value of the washing water is a zeroth ($0^{th}$) level, the controller judges that the washing water is a complete soft water and thus does not perform the washing of the ion-exchange resin.

Also, if the hardness value of the washing water exists between a first ($1^{st}$) level and a fourth ($4^{th}$) level, the controller performs the washing only one time, and if the hardness value of the washing water exists between a fifth ($5^{th}$) level and a seventh ($7^{th}$) level, the controller performs the washing three times. In other words, in case the hardness value is a zeroth ($0^{th}$) level, the hardness component does not exist in the washing water, so that the regeneration and washing steps of the ion-exchange resin are not required.

Also, if the hardness value of the washing water exists between a first ($1^{st}$) level and a fourth ($4^{th}$) level, it is the washing water of low hardness, the washing is performed only one time. If the hardness value of the washing water exists between a fifth ($5^{th}$) level and a seventh ($7^{th}$) level, it is the washing water of high hardness. Therefore, the washing step is repeatedly performed over three times, such that the hardness component of the ion-exchange resin can be efficiently removed. In doing so, the controller ends the washing of the ion-exchange resin, and if the number of times of the washing is judged not to be 'zero', the controller opens the water supply valve 22 to cause the washing water to flow into the ion-exchange-resin reservoir 42 (S63). At this time, the regeneration valve 46 is closed, and the washing water flowing into the ion-exchange-resin reservoir 42 washes the hardness component generated by the ion-exchange reaction between the ion-exchange resin 42a and the regenerative water 44a.

Also, the controller judges whether the opening time of the water supply valve 22 exceeds the predetermined washing time of the ion-exchange resin (S64). If the opening time of the water supply valve 22 is judged to exceed the washing time of the ion-exchange resin, the controller closes the water supply valve 22 and drains the washing water, which is used to wash the ion-exchange resin, to the outside using the drain pump 32 (S65 and S66). However, if the opening time of the water supply valve 22 is judged not to exceed the washing time of the ion-exchange resin, the controller maintains the openness of the water supply valve 22 and continuously flows the washing water into the ion-exchange-resin reservoir 42.

Then, the controller judges whether the number of openings of the water supply valve 22 exceeds a predetermined number of washings (S67). If the number of openings of the water supply valve 22 is judged to exceed a predetermined number of washings, the controller ends the washing of the ion-exchange resin. On the other hand, if the number of openings of the water supply valve 22 is judged not to exceed a predetermined number of washings, the controller opens the water supply valve 22 to repeatedly perform the step of flowing the washing water into the ion-exchange- resin reservoir 42.

The method according to the present invention has the following effects. The present invention performs the regeneration and washing of the water softener in the dish drying step, thereby sufficiently securing the regeneration time of the water softener and improving regenerating performance of the water softener. Also, after the dish washing and rinsing steps are completed, the regeneration and washing steps of the water softener are performed, thereby preventing a phenomenon that a variety of impurities such as a hardness component of the washing water and regenerative water is flowed into the washing tank. Finally, the present invention can control the regeneration time and the number of times of the washing of the water softener, depending on the hardness value of the washing water, thereby efficiently regenerating and washing the water softener.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of controlling a dishwasher having a water softening function performed by a water softener, the method comprising:
   loading in a tub of the dishwasher an item to be washed;
   supplying non-softened washing water to a water softener of the dishwasher, and softening the supplied washing water;
   washing the loaded item using the softened washing water;
   drying the washed item; and
   detecting a hardness level of the non-softened washing water, and regenerating, during the drying step, the water softener based on the detected hardness level of the non-softened water using one of a plurality different regenerating programs, wherein each regenerating program is tailored to a different predetermined hardness level associated with non-softened water supplied to the dishwasher wherein detecting a hardness level of the non-softened washing water comprises detecting the hardness level of the non-softened washing water before it enters the water softener using a water hardness sensor.

2. The method of claim 1, wherein washing the loaded item comprises:
   mixing a detergent into the softened washing water to produce a washing water solution for washing the loaded item;
   rinsing the washed item; and
   draining the tub.

3. The method of claim 1, wherein the drying and regenerating steps begin simultaneously.

4. The method of claim 1, wherein the drying and regenerating steps end simultaneously.

5. The method of claim 1, wherein the water softening function of the water softener is achieved using an ion-exchange resin, and wherein regenerating the water softener comprises:
   regenerating the ion-exchange resin by supplying regenerative water to the water softener; and
   washing the ion-exchange resin by supplying clean washing water to the regenerated ion-exchange resin.

6. The method of claim 5, wherein regenerating the water softener further comprises:
   selecting one of a plurality of different regeneration times, wherein each of the plurality of different regeneration times is based on a corresponding hardness level of non-softened washing water; and
   comparing the selected regeneration time with a duration of the supply of regenerative water to the water softener, wherein the regenerative water is supplied to the water softener based on the selected regeneration time.

7. The method of claim 6, further comprising:
   measuring a duration of the supply of regenerative water to the water softener; and
   discontinuing the supply of regenerative water to the water softener if the selected regeneration time is exceeded.

8. The method of claim 6, wherein detecting a hardness level of the non-softened washing water comprises detecting a pre-set hardness level of the non-softened washing water.

9. The method of claim 5, wherein regenerating the water softener further comprises:
   setting a number of washings of the ion-exchange resin based on the detected hardness level of the non-softened washing water; and
   applying washing water to the ion-exchange resin for a predetermined washing time of the ion-exchange resin based on the set number of washings.

10. The method of claim 9, wherein the applying step is repeated for a number of times equal to the set number of washings.

11. The method of claim 10, further comprising draining the washing water supplied by each repetition of the applying step.

12. The method of claim 11, further comprising:
    counting the number of repetitions of the applying step; and
    discontinuing the repetition of the applying step if the set number of washings is exceeded.

13. A method for controlling a dishwasher having a water softener, the method comprising:
    supplying non-softened water to the water softener, and softening the water;
    mixing a detergent with the softened water to produce washing water;
    washing an item received in a tub of the dishwasher using the washing water;
    rinsing the washed item;
    draining the tub;
    supplying regenerative water to an ion-exchange resin of the water softener to regenerate the ion-exchange resin while simultaneously drying the washed item, wherein a regeneration time is selected from a plurality of predetermined durations, wherein each predetermined duration corresponds to one of a plurality of predetermined hardness levels of non-softened water supplied to the water softener of the dishwasher wherein regenerating the ion-exchange resin comprises: detecting an actual hardness of the non-soften water supplied to the water softener to determined which of the predetermined hardness levels the detected actual hardness of the non-softened water fall within; setting a regeneration time based on which of the predetermined hardness levels the detected actual hardness of the non-softened water corresponds to; supplying regenerative water to the ion-exchange resin based on the set regeneration time; judging whether a regenerative-water-supply time exceeds the set regeneration time; and if the regenerative-water-supplying time exceeds the set regeneration time, stopping the supplying of regenerative water.

14. The method of claim 13, wherein the detected hardness level of the non-softened water is inputted by a user, or is detected by a hardness sensor.

15. The method of claim 1, wherein if the regenerative-water-supplying time does not exceed the set regeneration time, supplying regenerative water to the ion-exchange resin is repeatedly performed.

16. The method of claim 13, further comprising supplying water to the regenerated ion-exchange resin to wash the ion-exchange resin.

17. The method of claim 16, wherein washing the ion-exchange resin comprises:

detecting a hardness of the non-softened water to determine which of the plurality of predetermined hardness levels the non-softened water falls within and a corresponding washing time of the ion-exchange resin;

setting a number of washing times for the ion-exchange resin based on the predetermined hardness level of the water;

determining whether the set number of washing times is zero;

if the set number of washing times is not zero, supplying water to the ion-exchange resin;

draining the supplied water;

determining whether a number of times of supplying water to the ion-exchange resin exceeds the set number of washing times;

if the number of times of supplying the water exceeds the set number of washing times, terminating the washing of the ion-exchange resin; and if the number of times of supplying the water does not exceed the set number of washing times, repeating the supplying water, draining the supplied water and determining steps.

18. The method of claim 17, wherein if the set number of washing times is zero, no water is supplied to the ion-exchanger resin.

19. The method of claim 16, wherein the washing of the ion-exchange resin ends substantially simultaneously with the end of the drying step.

* * * * *

UNITED STATES PATENT AND TRADEMARK OFFICE
CERTIFICATE OF CORRECTION

PATENT NO. : 7,534,305 B2 Page 1 of 1
APPLICATION NO. : 10/917490
DATED : May 19, 2009
INVENTOR(S) : Myung Ho Kang It is certified that error appears in the above-identified patent and that said Letters Patent is hereby corrected as shown below:

Title Page, Item (30) should read:

(30) Foreign Application Priority Data

Feb. 13, 2004  (KR)  10-2004-0009693

Signed and Sealed this

Twenty-third Day of February, 2010

David J. Kappos
*Director of the United States Patent and Trademark Office*